United States Patent
Sutera

(10) Patent No.: US 10,162,750 B2
(45) Date of Patent: Dec. 25, 2018

(54) SYSTEM ADDRESS RECONSTRUCTION

(71) Applicant: Intel Corporation, Santa Clara, CA (US)

(72) Inventor: Massimo Sutera, Sunnyvale, CA (US)

(73) Assignee: INTEL CORPORATION, Santa Clara, CA (US)

(*) Notice: Subject to any disclaimer, the term of this patent is extended or adjusted under 35 U.S.C. 154(b) by 124 days.

(21) Appl. No.: 14/973,397

(22) Filed: Dec. 17, 2015

(65) Prior Publication Data

US 2017/0177477 A1 Jun. 22, 2017

(51) Int. Cl.
| | |
|---|---|
| *G06F 12/12* | (2016.01) |
| *G06F 12/0808* | (2016.01) |
| *G06F 12/0815* | (2016.01) |
| *G06F 12/06* | (2006.01) |
| *G06T 1/60* | (2006.01) |
| *G09G 5/39* | (2006.01) |

(52) U.S. Cl.
CPC .... *G06F 12/0607* (2013.01); *G06F 2212/656* (2013.01); *G06T 1/60* (2013.01); *G09G 5/39* (2013.01)

(58) Field of Classification Search
CPC ............ G06F 12/0842; G06F 12/0811; G06F 12/0866; G06F 12/121; G06F 12/0815; G06F 12/084; G06F 9/064; G06F 9/3004
USPC ......................................................... 711/157
See application file for complete search history.

(56) References Cited

U.S. PATENT DOCUMENTS

| | | | | |
|---|---|---|---|---|
| 6,625,685 | B1* | 9/2003 | Cho .................... | G06F 12/0607 711/105 |
| 8,386,727 | B2* | 2/2013 | Olarig ................. | G06F 12/0607 710/306 |
| 2015/0089168 | A1* | 3/2015 | Kalyanasundharam ..................... | G06F 12/0607 711/157 |

* cited by examiner

*Primary Examiner* — Mohamed Gebril
(74) *Attorney, Agent, or Firm* — Konrad Raynes Davda & Victor LLP

(57) ABSTRACT

System address reconstruction logic in accordance with one embodiment of the present description, reconstructs a system address from a channel address translated from the system address. The system address reconstruction logic includes logic configured to reconstruct one or more systems address fields as a function of the channel address, the number of memory controller target ways of the memory being equal to three, the number of bits of the granularity of interleaving of data among the memory controller target ways, the number of channels per memory controller target way, and the number of bits of the granularity of interleaving of data among the channels of a memory controller target way. Other aspects are described herein.

24 Claims, 7 Drawing Sheets

| Channel Granularity (ChGran) | Variable Bit Position X |
|---|---|
| 64B | 6 |
| 128B | 7 |
| 256B | 8 |
| 512B | 9 |
| 1024B | 10 |
| 2048B | 11 |
| 4064B | 12 |

FIG. 4A

| Target Granularity (TargetGran) | Variable Bit Position R |
|---|---|
| 64B | 6 |
| 256B | 8 |
| 4064B | 12 |

FIG. 4B

| Target Ways | Q-R |
|---|---|
| 1 | 0 |
| 2 | 1 |
| 4 | 2 |
| 8 | 3 |

SYSTEM ADDRESS RECONSTRUCTION

TECHNICAL FIELD

The present invention relates generally to memory apparatus having system address to channel address translation.

BACKGROUND

Devices having a memory for storing data often employ a memory controller which controls the transfer of write data to the memory and read data from the memory. A central processing unit having one or more processing cores typically provides to the memory controller a system address which defines the memory location at which the write data is to be stored or from which the read data is to be retrieved.

To facilitate data transfers to or from memory, the device may have multiple memory controllers, each of which controls data transfers to and from an assigned portion of the memory. Each memory controller referred to also as a memory controller target way, frequently has a unique logical identification (ID) often referred to as a target logical ID, which uniquely identifies the particular memory controller or memory controller target way. A system address typically includes one or more bits, depending upon the number of memory controllers or memory controller target ways in the device, associated with the target logical ID of the memory controller to which the data transfer is being addressed.

Data being transferred to or from a memory having multiple memory controllers is frequently interleaved so that a first portion of the data passes through one memory controller, a second portion of the data passes through the next memory controller and so on until the last memory controller is reached and then repeats beginning again with the first memory controller. In this manner, the memory controllers can operate in parallel to a degree to increase the speed of the overall data transfer. The size of the data portion handled by each memory controller and being interleaved with the data portions of the other memory controllers, is often described in terms of "target granularity" in which the greater the size of each memory controller portion of the interleaved data, the greater the size of the "grain" of the target granularity.

To further facilitate data transfers to or from memory, each memory controller may have multiple parallel data paths often referred to as channels to the memory portion assigned to that memory controller. Each channel of a memory controller frequently has a logical identification (ID) often referred to as a channel logical ID, which identifies the particular channel of the memory controller. A system address typically includes one or more bits, depending upon the number of channels for each memory controller in the device, associated with the channel logical ID of the channel to which the data transfer is being addressed.

Data being transferred to or from a memory controller having multiple channels is also frequently interleaved so that a first portion of the data passes over one channel of the memory controller, a second portion of the data passes over the next channel of the memory controller and so on until the last channel of the memory controller is reached and then repeats beginning again with the first channel of the memory controller. In this manner, the channels of the memory controller can operate in parallel to a degree to increase the speed of the overall data transfer through the memory controller. The size of the data portion handled by each channel and interleaved with the data portions of the other channels of the memory controller, is often described in terms of channel granularity in which the greater the size of each channel portion of the channel interleaved data, the greater the size of the "grain" of the channel granularity.

In a device having multiple memory controllers and multiple data transfer channels for each memory controller, the memory controllers translate a received system address to a channel address. In some circumstances, it may be useful to reconstruct the original system address from which the channel address was translated. For example, should an error occur in connection with the data transfer associated with a particular channel address, it may be useful to identify the system address corresponding to the channel address at which the error occurred.

However, a channel address frequently has fewer bits than the system address since any one channel typically addresses a smaller portion of the memory than the overall system. In performing the system to channel address conversion, bits of the system address are often discarded by the memory controllers due to interleaving of data transfers among the memory controllers of the device and the interleaving of data transfers among the channels of the memory controllers. As a result, attempts to reconstruct the original system address from a channel address having fewer bits than the original system address, has typically been unreliable, limited to special cases or not readily adapted to a logic implementation in a device.

BRIEF DESCRIPTION OF THE DRAWINGS

FIG. 4a is a chart of channel level granularity as a function of a variable bit position.

FIG. 4b is a chart of target level granularity as a function of a variable bit position.

FIG. 4c is a chart of variable bit positions as a function of number of target ways.

DESCRIPTION OF EMBODIMENTS

Figure 1:
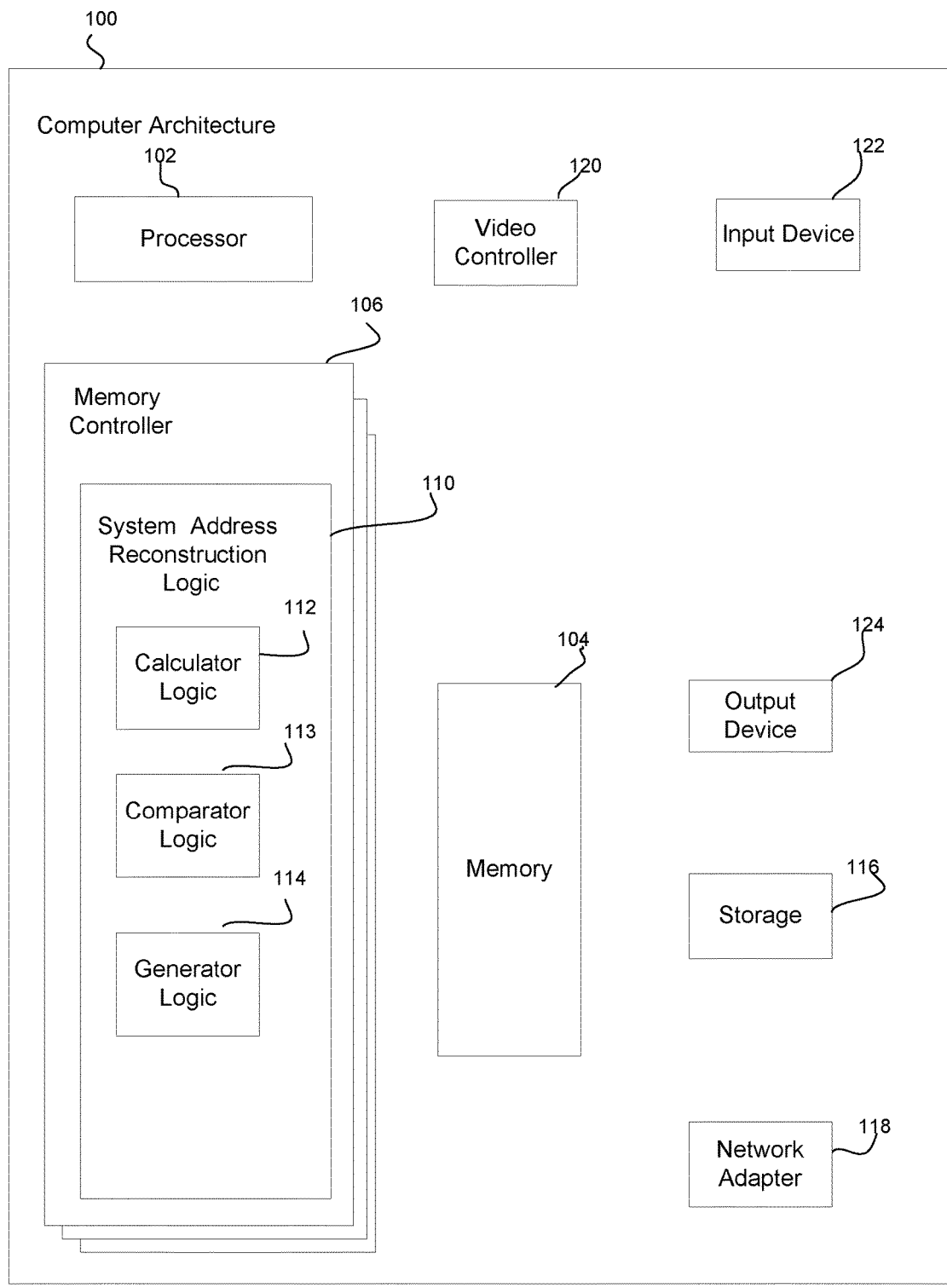
FIG. 1 is a schematic diagram of one embodiment of a computer architecture device employing system address reconstruction in accordance with one aspect of the present description.

System address reconstruction in accordance with one aspect of the present description, permits one or more fields of the original system address to be readily reconstructed from a channel address notwithstanding that the number of memory controllers in the system configuration may vary. Furthermore, system address reconstruction in accordance with another aspect of the present description, permits one or more fields of the original system address to be readily reconstructed from a channel address in a system employing data transfer interleaving notwithstanding that the configurations of the target level granularity and the channel level granularity may vary.

For example, the number of memory controllers or memory controller target ways commonly used may vary widely from as few as a single memory controller in one system to as many as eight or more in another system or system configuration. Further, the target level granularity of data transfer interleaving among the memory controllers may vary widely from as small as 64 bytes per memory controller in one system, for example, to as many as four kilo bytes per memory controller in another system or system configuration, for example. Still further, the channel level granularity of data transfer interleaving among the data transfer channels of a memory controller may vary widely from as small as 64 bytes per channel of the memory controller, for example, in one system to as many as four kilo bytes per channel of the memory controller, for example, in another system or system configuration.

Notwithstanding the wide ranges of possible configurations of memory controllers, target level granularity and channel level granularity commonly in use, system address reconstruction logic in accordance with one embodiment of the present description, may be readily configured in accordance with the particular system configuration being used, to reconstruct one or more fields of the original system address from a channel address. As explained in greater detail below, in a system having three channels per memory controller target way, the system address reconstruction logic in accordance with one embodiment of the present description, includes logic configured to reconstruct one or more systems address fields as a function of the channel address, the number of memory controller target ways of the memory, the number of bits of the granularity of interleaving of data among the memory controller target ways, and the number of bits of the granularity of interleaving of data among the channels of a memory controller target way.

More specifically, in system configuration having at least two memory controller target ways, the system address reconstruction logic is configured to calculate a first comparison bit as a function of the three channels per memory controller target way, a subfield of the channel address, a binary channel logical identification number, and the number of bits of the granularity of interleaving of data among the memory controller target ways. The system address reconstruction logic is further configured to compare the calculated first comparison bit to a first bit of a binary memory controller target logical identification number, and generate a first bit of an intermediate binary address field as a function of the first bit comparison. Additional bits of the intermediate binary address field may be generated in a similar manner for system configurations having four or more memory controller target ways. As explained in greater detail below, each additional generated bit of the intermediate binary address field is also a function of the previously generated bit, in one embodiment.

In the illustrated embodiment, the system address reconstruction logic is configured to insert the generated bit or bits of the intermediate binary address field together with selected subfields of the channel address to generate another intermediate binary address. Further, the system address reconstruction logic is configured to multiply the latter intermediate binary address field by three, the number of channels per memory controller target way to generate a third intermediate binary address. The system address reconstruction logic adds the binary channel logical identification number to the third intermediate binary address to generate a subfield of the system address. Another subfield of the channel address may be concatenated to the generated subfield of the system address to provide one or more subfields of a reconstructed system address, which may be utilized for various purposes such as error reports, for example.

In one embodiment, system address reconstruction in accordance with the present description may be applied to NAND flash memory. In another embodiment, system address reconstruction in accordance with the present description may be applied to a three dimensional (3D) crosspoint memory. System address reconstruction in accordance with the present description may be applied to systems employing a variety of different types of memory devices including in addition to the aforementioned NAND flash memory and three dimensional (3D) crosspoint memory, non-volatile memory such as spin torque transfer (STT) Random Access Memory (RAM), phase change memory, magnetic RAM, a resistive memory, nanowire memory, ferro-electric transistor random access memory (FeTRAM), flash memory such as NOR, and volatile memory such as 2D RAM, for example. Other types of memory may be suitable as well.

FIG. 1 illustrates one embodiment of a computer architecture device 100 employing system address reconstruction in accordance with one aspect of the present description. The computer architecture device 100 may comprise any computing device known in the art, such as a mainframe, server, personal computer, workstation, telephony device, network appliance, virtualization device, storage controller, portable or mobile devices (e.g., laptops, netbooks, tablet computers, personal digital assistant (PDAs), portable media players, portable gaming devices, digital cameras, mobile phones, smartphones, feature phones, etc.) or component (e.g. system on a chip, processor, bridge, memory controller, memory, etc.). The architecture device 100 may include a processor 102 (e.g., a microprocessor), a memory 104 (e.g., a volatile or nonvolatile memory device), and a memory controller 106 having data transfer logic configured to control input and output operations to and from the memory 104, such as data write and data read operations, for example.

As explained in greater detail below, the logic of the memory controller 106 includes a system address reconstruction logic 110 which permits one or more fields of the original system address to be readily reconstructed from a channel address in a memory system having three channels per memory controller, notwithstanding that the number of memory controllers in the system may vary, and the target level granularity and the channel level granularity of the may vary. In the illustrated embodiment, the system address reconstruction logic 110 of the memory controller 106 includes calculator logic 112, comparator logic 113 and generator logic 114, and is disposed on one or more semiconductor dies within the device 100. For example, the system address reconstruction logic 110 may be disposed on the same die or dies of the memory controller 106. Although the system address reconstruction logic 110 is depicted as a part of the memory controller 106, it is appreciated that the system address reconstruction logic 110 may be fabricated as a part of other circuits of the computer architecture device 100. For example, in one embodiment, one or more of the memory dies of the memory 104 may be included in the same package as the logic die or dies for the memory controller 106 or the system address reconstruction logic 110. Alternatively, one or more of the memory dies of the memory 104 may be housed outside the package of the logic die, on top of the logic die, adjacent to the logic die or on a plug in module such as a dual in line memory module (DIMM). The system address reconstruction logic 110 may be implemented with software, hardware, firmware or combinations thereof.

As used herein, the term "automated" includes fully automated in which system address reconstruction operations in accordance with the present description take place without any user intervention. Also, the term "automated" includes substantially automated in which system address reconstruction operations in accordance with the present description take place with limited user intervention. However, in substantially automated operations, most of system address reconstruction operations proceed without any user intervention. In one embodiment, the system address reconstruction operations in accordance with the present description are fully automated and take place without any user intervention. In other embodiments, at least 50%, at least 75% or at least 95% of the system address reconstruction operations proceed without any user intervention.

The computer architecture device 100 may further include storage 116 (e.g., a non-volatile storage, such as magnetic disk drives, optical disk drives, a tape drive, flash memory, etc.). The storage 116 may employ system address reconstruction in accordance with the present description, and may comprise an internal storage device or an attached or network accessible storage. Programs in the storage 116 are loaded into the memory 104 and executed by the processor 102 in a manner known in the art.

The computer architecture device 100 further includes a network controller or adapter 118 to enable communication with a network, such as an Ethernet, a Fiber Channel Arbitrated Loop, etc. Further, the architecture may, in certain embodiments, include a video controller 120 configured to control a display in response to the processor, to render information on a display. The video controller 120 may be embodied on a video card or integrated on integrated circuit components mounted on a motherboard or other substrate. An input device 122 is used to provide user input to the processor 102, and may include a keyboard, mouse, pen-stylus, microphone, touch sensitive display screen, input pins, sockets, or any other activation or input mechanism known in the art. An output device 124 is capable of rendering information transmitted from the processor 102, or other component, such as a display screen or monitor, printer, storage, output pins, sockets, etc. The network adapter 118 may embodied on a network card, such as a Peripheral Component Interconnect (PCI) card, PCI-express, or some other I/O card, or on integrated circuit components mounted on a motherboard or other substrate.

One or more of the components of the device 100 may be omitted, depending upon the particular application. For example, a network router may lack a video controller 120, for example. Also, any one or more of the components of the computer architecture device 100 may include one or more integrated memory circuits having system address reconstruction in accordance with the present description.

Figure 2:
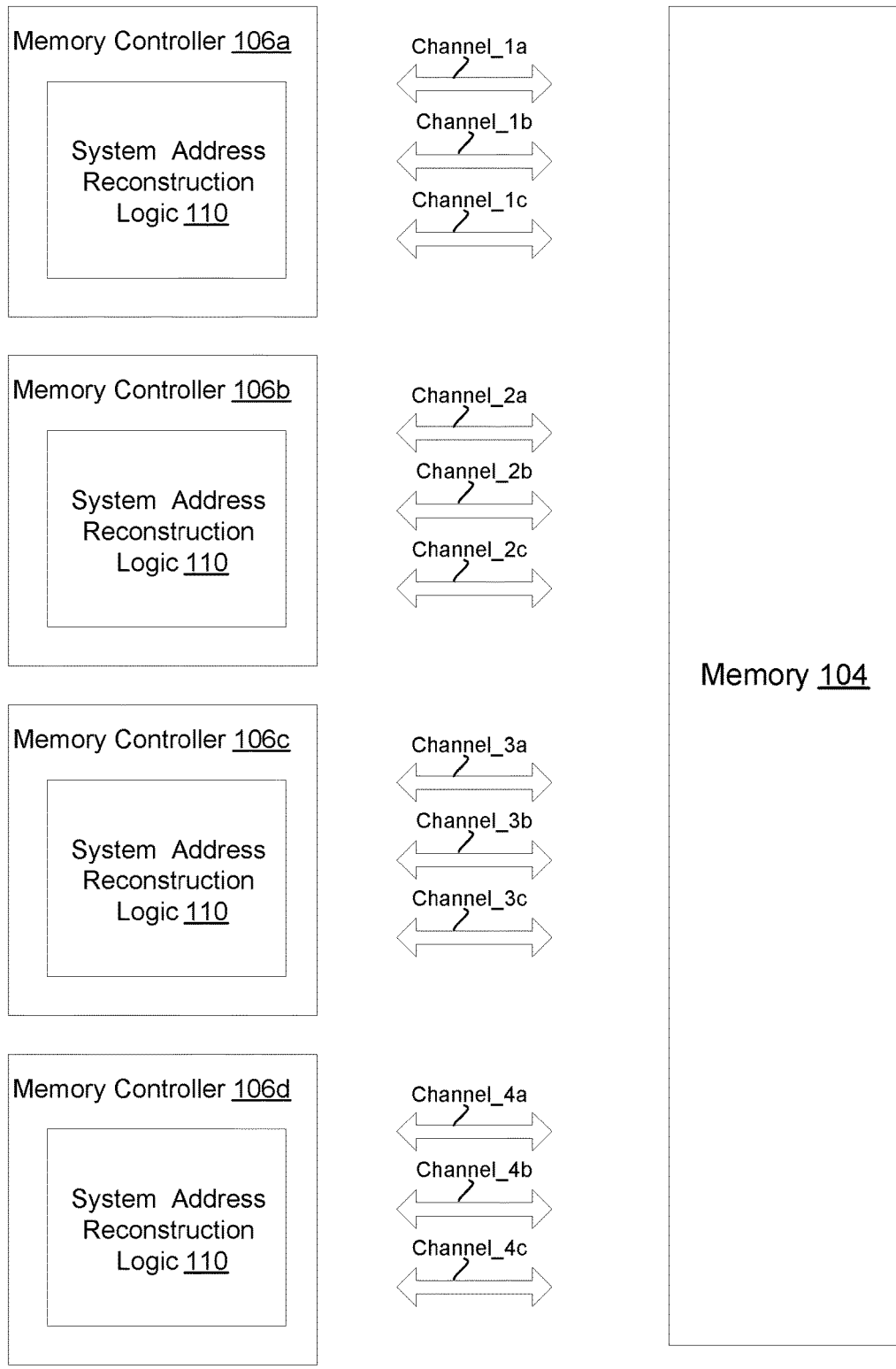
FIG. 2 depicts an example of a memory system employing one embodiment of system address reconstruction in accordance with the present description.

FIG. 2 shows an example of a memory system of the device 100 which includes the memory 104 and four memory controllers, 106a, 106b, 106c and 106d. Data transfers between the processor 102 and the four memory controllers, 106a, 106b, 106c and 106d, may be interleaved at a memory controller level, at a particular target level granularity. It is appreciated that the number of memory controllers in a memory system employing system address reconstruction in accordance with the present description may vary from as few as one, for example, to as many as eight or more, for example, depending upon the particular application.

Each memory controller, 106a-106d, has three parallel data transfer channels for data transfers between the memory 104 and the associated memory controller. Thus, the memory 106a has, in this example, three parallel data transfer channels, channel_1a, channel_1b and channel_1c, coupling the memory 106a to the memory 104. The memory controllers, 106b-106d, similarly have parallel data transfer channels, channel_2a-channel_2c, channel_3a-channel_3c and channel_4a-channel_4c, respectively. Data transfers between the each of the four memory controllers, 106a, 106b, 106c and 106d, and the memory 104 may also be interleaved at the data transfer channel level, at a particular channel level granularity. A data transfer operation is initiated by a processor such as the processor 102 (FIG. 1) providing a system address to the memory controllers, 106a-106d (FIG. 2). Although described in connection with the processor 102, it is appreciated that data transfer operations may be initiated by other processors or other controllers such as direct memory access (DMA) controllers, for example.

Figure 3:
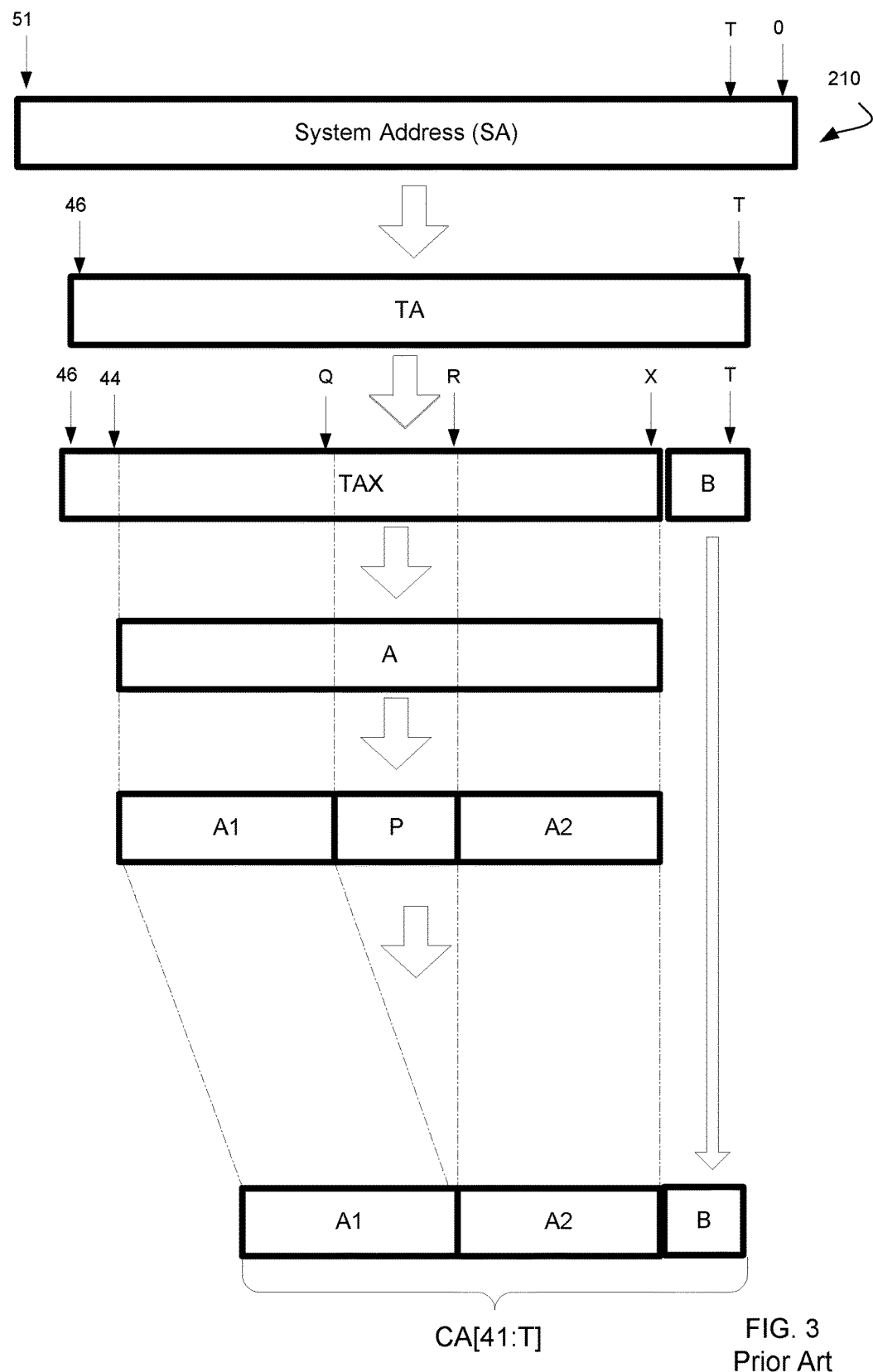
FIG. 3 is an example of a prior system address to channel address translation.

The memory controllers translate a received system address to a channel address which is provided over the appropriate data transfer channel to the memory 104. FIG. 3 depicts a schematic representation of one example of a known system address (SA) to channel address (CA) translation process. In the example of FIG. 2, a system address is 52 bits wide as represented by the system address SA[51:0] stored in a register 210 in which the least significant bit is designated bit 0 and the most significant bit is designated bit 51. An intermediate variable bit position represented as variable bit position T defines a subfield SA[T−1:0] of the system address which is omitted from the process depicted in FIG. 3 for clarity. The subfield SA[T−1:0] defines the least significant granularity of the system addresses in this example. For example a bit position T=bit position 6 defines a granularity of 64 bytes, for example, which is set by the user's configuration of the memory system. It is appreciated that the number of bits in a system address and the channel address to which it is translated, and the position of the address bit position T, may vary, depending upon the particular application.

In translating the system address SA to the channel address CA, various intermediate address fields are generated. More specifically, an intermediate binary address field represented as address field TA in FIG. 3 may be generated by selecting a subfield SA[51:T] of the system address SA and subtracting an offset address often referred to TAD_offset[51:T] such that the first intermediate binary address field TA[46:T] may be generated as SA[51:T]−TAD_offset[51:T].

Another intermediate binary address field represented as address field B in FIG. 3 may be generated by selecting another subfield TA[X:T] of the first intermediate address field TA where the bit position X is a variable which affects the channel level granularity of the channel level interleaving of data among the channels of a memory controller. The number of bits of the channel level granularity may be defined as [X−T] and is set by the user's configuration of the memory system. Thus, the intermediate binary address field B may be generated as B[X−T:0]=TA[X:T]. Accordingly, the more significant the bit position of the bit position variable X, the wider the field of the second intermediate binary address field B, and the greater the grain size of the channel level granularity.

FIG. 4A is a chart showing the resultant channel level granularity for various potential bit positions 6-12 for the variable X assuming a bit position for variable bit position T=6. Thus, if the channel level granularity bit position X is at bit position X=6, the channel level granularity is at a granularity of 64 bits (64=2 to the power of 6). If the channel level granularity bit position X is at bit position X=7, the channel level granularity is at a granularity of 128 bits (128=2 to the power of 7) in this example, and so on. The greater the significance of the bit position X, wider the field of the intermediate binary address field B, and the greater the size of the channel level granularity. Accordingly, the intermediate binary address field B[X−T:0]=TA[X:T] is related to the channel level granularity. It is appreciated that the potential bit positions of the variable X and the associated channel level granularities may vary, depending upon the particular application. The intermediate binary address field B isconcatenated with other intermediate address fields to generate the channel address CA as discussed below.

Another intermediate binary address field represented as address field TAX in FIG. 3 may be generated by selecting a subfield TA[46:X] of the intermediate address field TA where the bit position X is a variable which reflects the channel level granularity of the channel level interleaving of data among the channels of a memory controller as noted above. Thus, the intermediate binary address field TAX may be generated as TAX[46−X:0]=TA[46:X].

The next intermediate binary address field represented as address field A in FIG. 3 is generated by performing an integer division of the intermediate binary address field TAX. The divisor of the integer division is three in that the memory system has three data transfer channels associated with each memory controller target way. Thus, in the embodiment of FIG. 2 in which each memory controller has three channels, the intermediate binary address field A may be generated as A[44−X:0]=int[TAX/3].

In a division of a binary address field by 3, the possible remainders after the division are 00, 01 or 10. In that the embodiment of FIG. 2 has three channels per memory controller, the remainders may be used as channel logical identifications (IDs). Thus the channel_1a may be assigned a channel logical ID of 00, the channel_1b may be assigned a channel logical ID of 01 and the channel_1c may be assigned a channel logical ID of 10, for example. The channel logical identification number of each channel is set by the user's configuration of the memory system. As explained in greater detail below, in accordance with one aspect of the present description, the channel logical ID may be utilized to reconstruct the original system address SA from the channel address directed to a channel having the particular channel logical ID.

The intermediate binary address field A={A1, P, A2} has three subfields A1, P and A2 as shown in FIG. 3. The boundary between the subfields P and A2 is defined by a bit position variable R such that the subfield A2 of the field A is defined as A2[R−X:0]=A[R−X:0]. Accordingly, the subfield A2 extends from the variable bit position X to the variable bit position R and thus is positioned in the R−X least significant bits of the binary address field A.

The target level granularity of the target level interleaving of data among the memory controllers of the subsystem of FIG. 2, is set by the user's configuration of the memory system, and is a function of the variable expression R−X. Accordingly, the variable expression R−X is set by the user's configuration of the memory system. Thus, the subfield A2 of the field A defined as A2[R−X:0]=A[R−X:0], is related to the target level granularity.

FIG. 4B is a chart showing several examples of the resultant target level granularity for various potential bit positions for the variable bit position R which may be set by the user's configuration of the memory system. Thus, if the target level granularity bit position R is at bit position R=6, the target level granularity is at a granularity of 64 bits (64=2 to the power of 6). If the target level granularity bit position R is at bit position R=8, the target level granularity is at a granularity of 256 bits (256=2 to the power of 8) in this example. If the target level granularity bit position R is at bit position R=12, the target level granularity is at a granularity of 4096 bits (4096=2 to the power of 12) in this example. The greater the significance of the bit position R relative to the variable bit position X, the wider the field of the intermediate binary address field A2, and the greater the size of the target level granularity. It is appreciated that the potential bit positions of the variables R, X and the associated target level granularities may vary, depending upon the particular application. The intermediate binary address field A2 is concatenated with other intermediate address fields to generate the channel address CA as discussed below.

The boundary between the subfields A1 and P is defined by a bit position variable Q such that the subfield A1 of the field A is defined as A1[44−X:Q−X]=A[44:Q−X]. Accordingly, the subfield A1 extends from the bit position Q to the bit position 44 of the intermediate binary address field A and thus is positioned in the 44-Q most significant bits of the binary address field A. The intermediate binary address field A2 is concatenated with other intermediate address fields to generate the channel address CA as discussed below. The address field A2 is also referred to herein as the channel address upper field.

The third subfield P of the intermediate binary address field A is positioned between the subfields A2 and A1 and is defined by both bit position variables Q and R such that the subfield P of the field A is defined as P[Q−R:0]=A[Q−X:R−X]. Accordingly, the subfield P extends from the variable bit position R to the variable bit position Q.

The number of target ways or memory controllers supported by the subsystem of FIG. 1, is a function of the variable expression Q−R which is set by the user's configuration of the memory system. Accordingly, the subfield P of the field A defined as P[Q−R:0]=A[Q−X:R−X], is related to the number of target ways in the system.

FIG. 4C is a chart showing several examples of the number of target ways associated with the various potential bit positions for the variable bit positions Q and R. Thus, if the variable bits positions Q and R are the same, the variable expression Q−R=0 which is associated with one target way, that is, one memory controller. Accordingly, since the subfield P, which is related to the number of target ways, is Q−R bits wide, if the variable expression Q−R=0 bit positions, the subfield P is zero bits wide, that is, it is not present in the intermediate binary address field A for a system having a single target way or memory controller.

In another example, if the variable bit position Q is one bit position more significant than the bit position R, the variable expression Q−R=1 bit position, which is sufficient to distinguish two target ways, and therefore is associated with two target ways, that is, two memory controllers. Accordingly, since the subfield P, related to the number of target ways, is Q−R bits wide, if the variable expression Q−R=1 bit position, the subfield P is one bit wide, in the intermediate binary address field A for a system having two target ways or memory controllers.

In yet another example, if the variable bit position Q is three bit positions more significant than the bit position R, the variable expression Q−R=3 bit positions which is sufficient to distinguish eight target ways and therefore is associated with eight target ways, that is, eight memory controllers. Accordingly, since the subfield P is Q−R bits wide, if the variable expression Q−R=3, the subfield P is three bits wide, in the intermediate binary address field A for a system having eight target ways or memory controllers. Furthermore, the target logical identification (ID) is a function of the subfield from bit position Q to bit position R of the intermediate binary address field TAX.

To form the channel address CA, the subfield P of the intermediate binary address field A is dropped, and the remaining subfields A1 and A2 are concatenated together as shown in FIG. 3. The least significant bits of the channel address field CA[41:T] are provided by the subfield B of the intermediate binary address field TAX. As a result, the channel address field CA[41:T] may be generated as CA[41:T]={A1, A2, B} which is the concatenation of subfields A1, A2 and B and extends from variable bit position T to bit position 41 in the illustrated embodiment. The least significant bits of the Channel address CA[41:0] are provided by the subfield SA[5:0] of the system address SA such that CA[5:0]=SA[5:0].

In a data transfer operation directed to channel address CA translated from the system address SA as described above, an occasion may arise where it would be useful to have the capability of reverse translating or otherwise reconstructing the original system address SA from the channel address CA. For example, if an error occurs in connection with the data transfer targeting the memory location addressed by the channel address CA, it may be useful for the memory controller to report to the processor requesting the data transfer that an error occurred and to report the system address at which the error occurred.

However, because the field P, the size of which is a function of the number of target ways, is typically dropped in connection with the translation of the system address SA to the channel address CA, reverse translating the system address SA from the channel address CA has previously been hindered by the dropping of the information represented by the dropped subfield P. In addition, reverse translating the system address SA from the channel address CA has been hindered by the variability in the number of target ways, target level granularity and channel level granularity from system to system and system configuration to system configuration.

System address reconstruction in accordance with one aspect of the present description, permits one or more fields of the original system address to be readily reconstructed from a channel address notwithstanding that the address field relating to the number of target ways may be discarded in the system address to channel address translation. Moreover, system address reconstruction in accordance with one aspect of the present description, permits one or more fields of the original system address to be readily reconstructed from a channel address notwithstanding that the number of memory controllers in the system may vary. Furthermore, system address reconstruction in accordance with another aspect of the present description, permits one or more fields of the original system address to be readily reconstructed from a channel address in a system employing data transfer interleaving notwithstanding that the target level granularity and the channel level granularity of the particular configuration may vary.

Figure 5:
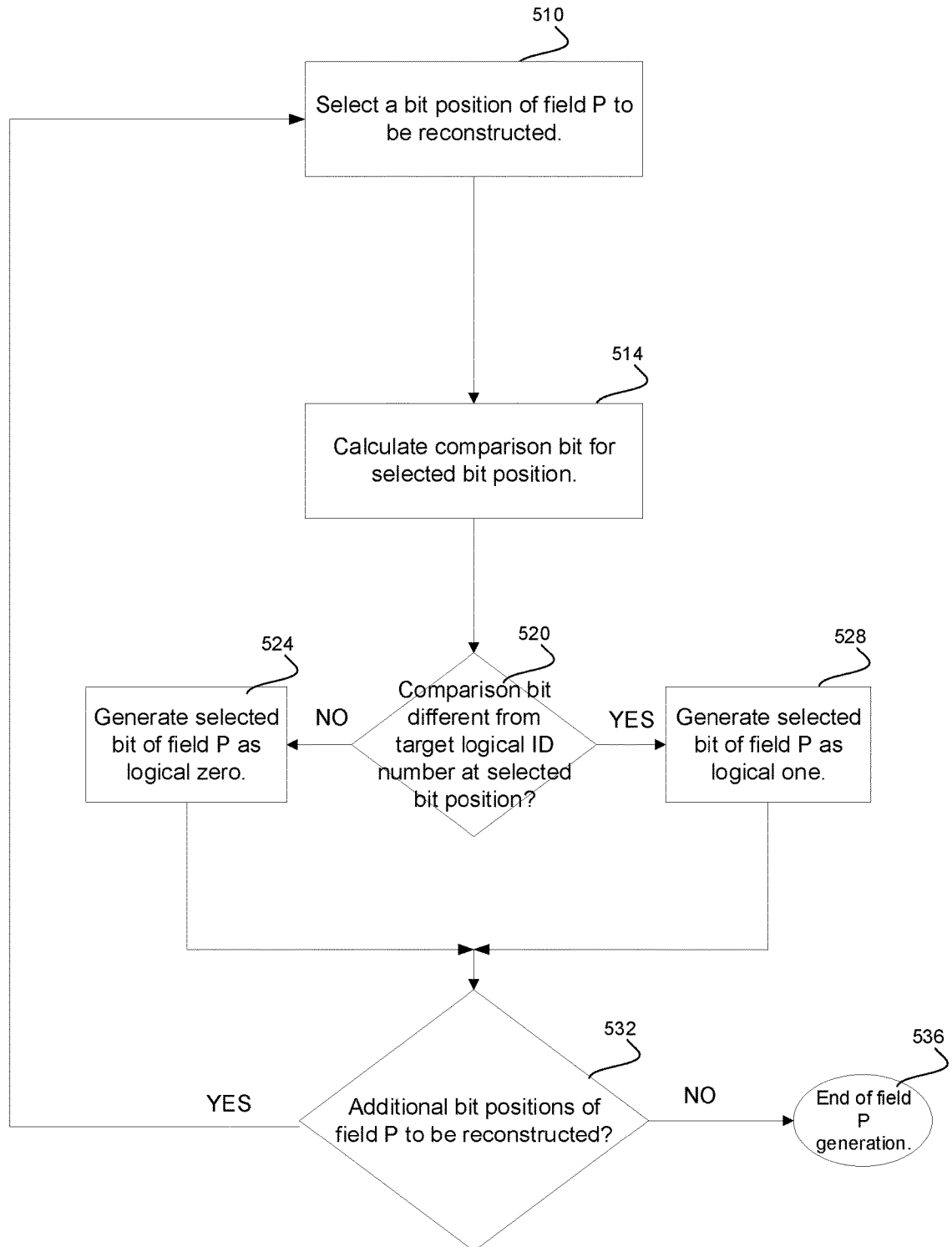
FIG. 5 is an example of one embodiment of operations performing system address reconstruction in accordance with one aspect of the present description.
Figure 6:
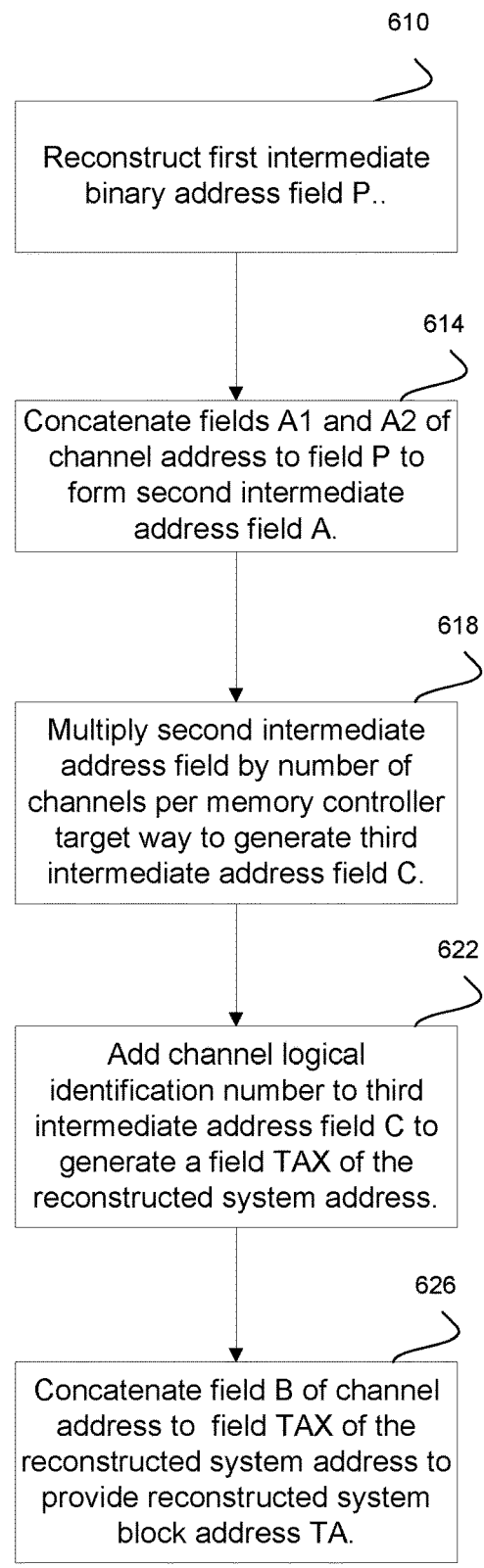
FIG. 6 is another example of an embodiment of operations performing system address reconstruction in accordance with one aspect of the present description.
Figure 7:
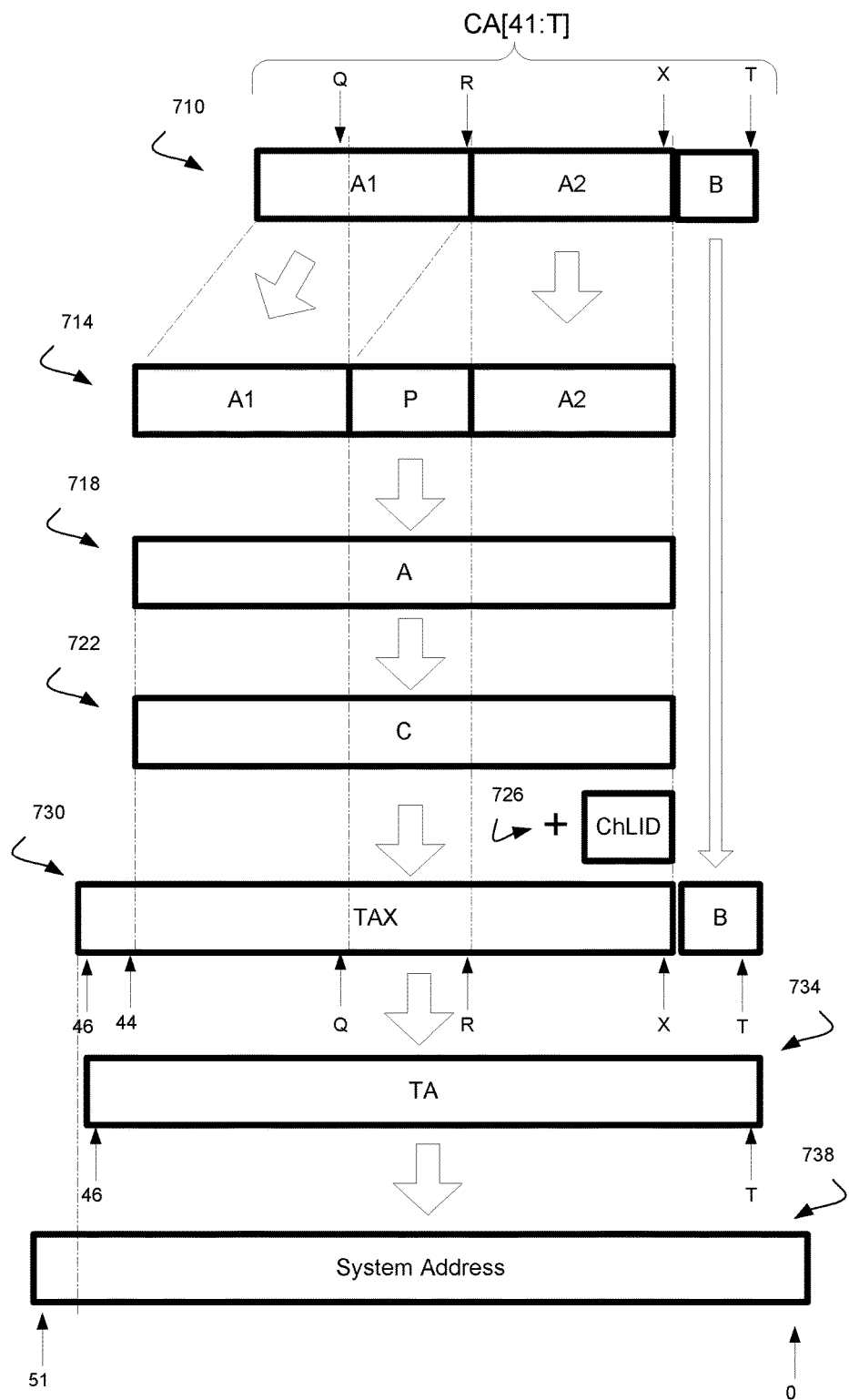
FIG. 7 is a schematic depiction of one example of the operations of FIG. 6 performing system address reconstruction in accordance with one aspect of the present description.

FIGS. 5, 6 and 7 depict examples of operations for system address reconstruction in accordance with one aspect of the present description. More specifically, FIG. 5 depicts one embodiment of operations for address field P reconstruction for memory systems having at least two memory controllers and associated memory controller target ways.

As previously noted, the field P is related to the number of target ways in the system, and is discarded in the course of the system address to channel address translation or is otherwise unavailable for a reverse translation from the channel address back to the original system address. In accordance with one aspect of the present description, the address field P is reconstructed in a memory system having three channels per memory controller target way, as a function of various system memory configuration parameters in addition to the channel address CA (FIG. 7), including the number of memory controller target ways of the memory, the number of bits (R−X) of the granularity of interleaving of data among the memory controller target ways, and the number of bits (X−T) of the granularity of interleaving of data among the channels of a memory controller target way. Accordingly, system address reconstruction in accordance with the present description can accommodate a wide range of different configurations of the memory system.

In one operation of the address field P reconstruction, a bit position of the address field P is selected (block 510) for reconstruction. In the illustrated embodiment, the reconstruction is initiated for the least significant bit of the address field P, that is, address bit P0 of the address field P. A comparison bit is calculated (block 514) for the selected bit position, bit position P0 in this example.

In the illustrated embodiment in a memory system having three channels per memory controller target way, calculator logic 112 of the system address reconstruction logic 110 is configured to calculate a first comparison bit as a function a subfield of the channel address, a binary channel logical identification number, and the number of bits of the granularity of interleaving of data among the memory controller target ways. More specifically, in one embodiment, the first comparison bit may be calculated as:

$$(3*A2+ChLID)[R-X]$$

wherein the number of memory controllers is two or more, 3 is the number of channels per memory controller, the number of bits of the granularity of interleaving of data among the channels of a memory controller target way is represented by the variable X−T (FIG. 7) wherein the variable X is >=T and is a bit position of the channel address and T is a bit position of the channel address, the number of bits of the granularity of interleaving of data among the memory controller target ways is represented by the variables R−X where the variable R is >=X and is a bit position of the channel address, the variable [R−X] represents a bit position, the variable ChLID represents the binary channel logical identification number, the variable A2 represents the subfield A2=CA[R−1:X] of the channel address from the bit position X to the bit position R−1, the variable TargetLID[0] represents the 0 bit position of the binary channel logical identification number. The constant 3 and the values of the variables A2, ChLID, R, and X are known from the memory system configuration and therefore the first comparison bit may be readily calculated as set forth above.

For example, the number of channels per memory controller at which the memory system is configured is three. The channel level granularity at which the memory system is configured defines the variable bit position X as shown in FIG. 4A. Similarly, the target level granularity at which the memory system is configured defines the variable bit position R as shown in FIG. 4B. The number of target ways at which the memory system is configured defines the variable bit positions Q–R as shown in FIG. 4C. The address subfields A1, A2 and B of the channel address are identified by the known bit position variables Q, R, X and T as shown in FIG. 7. The channel and target logical identification numbers at which the memory system has been configured are known as well.

In another operation, the calculated comparison bit is compared to the target logical ID number at a selected bit position to determine (block 520, FIG. 5) whether the calculated comparison bit is different from the target logical ID number at the selected bit position. In this example, the selected bit position is the 0 bit position of the binary channel logical identification number as represented by the variable TargetLID[0] representing the least significant bit of the target logical ID. In the illustrated embodiment, the comparator logic 113 of the system address reconstruction logic 110 is configured to compare the first calculated comparison bit to the TargetLID[0] bit. The generator logic 114 of the system address reconstruction logic 110 is configured to generate the first bit P0 of the intermediate binary address field P as a logical zero (block 524) if the first comparison bit is the same as the TargetLID[0] bit and as a logical one (block 528) if the first comparison bit is different from the TargetLID[0] bit.

If the memory system has four or more memory controllers and associated memory controller target ways, it is determined (block 532) that additional bit positions of the intermediate binary address field P are to be reconstructed. If not, the reconstruction of the single bit P0 completes the reconstruction of the intermediate binary address field P (block 536).

Accordingly, if the memory system has four or more memory controllers and associated memory controller target ways, the next bit position of the address field P is selected (block 510) for reconstruction. In the illustrated embodiment, the reconstruction continues for the next least significant bit of the address field P, that is, address bit P1 of the address field P. A comparison bit is again calculated (block 514) for the selected bit position, bit position P1 in this example.

In the illustrated embodiment, calculator logic 112 of the system address reconstruction logic 110 is further configured to calculate a second comparison bit as a function of the previously generated least significant bit P0 of the address field P, a subfield of the channel address, and system configuration parameters including the number of channels per memory controller target way equal to three, a binary channel logical identification number, and the number of bits of the granularity of interleaving of data among the memory controller target ways. More specifically, in one embodiment, the second comparison bit may be calculated as:

$$(3*P0*2^{**}(R-X)+3*A2+ChLID)[R-X]$$

wherein the number of memory controllers is four or more, 3 is the number of channels per memory controller, the generated least significant bit of the field P is represented by the bit P0, the operator "**" indicates the following expression (R–X) is an exponent, the number of bits of the granularity of interleaving of data among the memory controller target ways is represented by the variables R–X where the variable R is >=X and is a bit position of the channel address, the variable [R–X] represents a bit position, the variable ChLID represents the binary channel logical identification number, the variable A2 represents the subfield A2=CA[R–1:X] of the channel address from the bit position X to the bit position R–1, the variable TargetLID[1] represents the 1 bit position of the binary target logical identification number. The values of the variables P0, A2, ChLID, R, and X are known from a prior calculation (P0), are known subfields (A2) of the channel address, or are known system configuration parameters (ChLID, R, X) and therefore the second comparison bit may be readily calculated as set forth above.

In another operation, the calculated comparison bit is compared to the known target logical ID number at a selected bit position as represented as represented by the bit position variable TargetLID[1] to determine (block 520, FIG. 5) whether the calculated comparison bit is different from the target logical ID number at the selected bit position. In this example, the selected bit position is the 1 bit position of the binary target logical identification number as represented by the bit position variable TargetLID[1]. In the illustrated embodiment, the comparator logic 113 of the system address reconstruction logic 110 is configured to compare the second calculated comparison bit to the TargetLID[1] bit. The generator logic 114 of the system address reconstruction logic 110 is configured to generate the second bit P1 of the intermediate binary address field P as a logical zero (block 524) if the second comparison bit is the same as the TargetLID[1] bit and as a logical one (block 528) if the second comparison bit is different from the TargetLID[1] bit.

If the memory system has eight or more memory controllers and associated memory controller target ways, it is determined (block 532) that additional bit positions of the intermediate binary address field P are to be reconstructed. If not, the reconstruction of the bits P0, P1 completes the reconstruction of the intermediate binary address field P (block 536) as =P{P1, P0}.

Accordingly, if the memory system has eight or more memory controllers and associated memory controller target ways, the next bit position of the address field P is selected (block 510) for reconstruction. In the illustrated embodiment, the reconstruction continues for the next least significant bit of the address field P, that is, address bit P2 of the address field P. A comparison bit is again calculated (block 514) for the selected bit position, bit position P2 in this example.

In the illustrated embodiment, calculator logic 112 of the system address reconstruction logic 110 is further configured to calculate a third comparison bit as a function of the previously generated bits P0, P1 of the address field P, the number of channels per memory controller target way, a subfield of the channel address, a binary channel logical identification number, and the number of bits of the granularity of interleaving of data among the memory controller target ways. More specifically, in one embodiment, the third comparison bit may be calculated as:

$$(3*P1*2^{**}(R-+1-X)+3*P0*2^{**}(R-X)\pm 3*A2+ChLID)[R-X];$$

wherein the number of memory controllers is eight or more, 3 is the number of channels per memory controller, the operator "**" indicates the following expression is an exponent, the number of bits of the granularity of interleaving of data among the memory controller target ways is represented by the variables R–X where the variable R is >=X and is a bit position of the channel address, the variable [R–X] represents a bit position, the variable ChLID represents the binary channel logical identification number, the variable A2 represents the subfield A2=CA[R–1:X] of the channel address from the bit position X to the bit position R–1, the bit position variable TargetLID[2] represents the 2 bit position of the binary target logical identification number.

The values of the variables P0, P1, A2, ChLID, R, and X are known and therefore the third comparison bit may be readily calculated as set forth above.

In another operation, the calculated comparison bit is compared to the known target logical ID number at a selected bit position as represented as TargetLID[2] to determine (block 520, FIG. 5) whether the calculated comparison bit is different from the target logical ID number at the selected bit position. In this example, the selected bit position is the 2 bit position of the binary target logical identification number as represented by the TargetLID[2]. In the illustrated embodiment, the comparator logic 113 of the system address reconstruction logic 110 is configured to compare the third calculated comparison bit to the TargetLID[2] bit. The generator logic 114 of the system address reconstruction logic 110 is configured to generate the third bit P2 of the intermediate binary address field P as a logical zero (block 524) if the third comparison bit is the same as the TargetLID[2] bit and as a logical one (block 528) if the third comparison bit is different from the TargetLID[2] bit.

If the memory system has sixteen or more memory controllers and associated memory controller target ways, additional bit positions of the intermediate binary address field P may be reconstructed in a similar manner. If not, the reconstruction of the bits P0, P1, P2 completes the reconstruction of the intermediate binary address field P (block 536) wherein the intermediate binary address field P=P{P2, P1, P0}.

The reconstruction of the first intermediate binary address field P described in connection with FIG. 5 is represented by the operation (block 610) of FIG. 6. The generator logic 114 is further configured to insert the generated bits of the first intermediate binary address field and selected subfields of the channel address into a second intermediate binary address field. In the illustrated embodiment, as shown in FIG. 7, the address subfields A1 and A2 of the channel address CA[41:T] indicated at 710, may be concatenated (block 614, FIG. 6) by the generator logic 114, with the generated first intermediate binary address field P as indicated at 714, (FIG. 7) to form a second intermediate binary address field A=A{A1, P, A2} having the three concatenated subfields A1, P and A2 as shown at 714, 718 in FIG. 7.

In the channel address CA, the boundary between the subfields A1 and A2 is defined by the bit position variable R such that the subfield A2 of the channel address CA is defined as the subfield A2=CA[R-1:X] of the channel address from the bit position X to the bit position R-1. The subfield A1 of the channel address CA is defined as the subfield A1=CA[43:R] of the channel address from the bit position R to the bit position 43. The remaining subfield B of the channel address CA is defined as the subfield B=CA[X-T:T] of the channel address from the bit position T to the bit position X. As previously mentioned, in one example, the bit position T may be defined as bit position T=6 of the system address for a 64 bit granularity.

The generator logic 114 is further configured to multiply the second intermediate binary address field by 3, which is the number of channels per memory controller target way, to generate a third intermediate binary address field. In the illustrated embodiment of FIG. 2, the memory system has 3 channels per memory controller. Hence, in this embodiment, the third intermediate binary address field C indicated at 722 in FIG. 7 may be generated by the generator logic 114 by multiplying (block 618, FIG. 6) the second intermediate binary address field A by 3 which is the number of channels per memory controller target way in the embodiment of FIG. 2 to generate a third intermediate binary address field C.

The generator logic 114 is further configured to add the binary channel logical identification number to the third intermediate binary address field to generate a fourth intermediate binary address field. The channel logical identification number represented by the variable ChLID above, is a constant for a particular channel and is the remainder of the integer division described above in connection with the system address to channel address translation. In the illustrated embodiment, the channel logical identification number ChLID (FIG. 7) is added (block 622, FIG. 6) to the third intermediate binary address field C as indicated at 726 in FIG. 7 to generate the fourth intermediate binary address field TAX as indicated at 730. Hence, in the embodiment of FIG. 2, the intermediate binary address field TAX=3*A+ChLID where 3 is the number of channels per memory controller and the binary address field A is the second intermediate address field discussed above.

The generator logic 114 is further configured to concatenate a subfield of the channel address to the generated fourth intermediate binary address field to generate a fifth intermediate binary address field. In the illustrated embodiment, the channel address subfield B=CA[X-T, T] where T can equal bit position 6, for example, is concatenated (block 626, FIG. 6) to the fourth intermediate binary address field TAX as indicated at 730 in FIG. 7 to generate a fifth intermediate binary address field TA as indicated at 734 in FIG. 7 where the fifth intermediate binary address field TA[46:T]={TAX, B}.

The generator logic 114 may be further configured to reconstruct at least a subfield of the system address from the fifth intermediate binary address field by adding back the offset address. As previously mentioned, in translating the system address SA to the channel address CA, an intermediate binary address field represented as address field TA in FIG. 3 may be generated by selecting a subfield SA[51:T] of the system address SA and subtracting an offset address often referred to TAD_offset[51:T] such that the intermediate binary address field TA[46:T] may be generated as SA[51:T]-TAD_offset[51:T]. Accordingly, the system address subfield SA[51:T] may be reconstructed from the fifth intermediate binary address field TA[46:T]={TAX, B}, by adding back the offset address TAD_offset[51:T]. The field SA[T-1:0] of the system address not involved in the translation to the intermediate channel address CA[41:T] may be concatenated to the reconstructed system address subfield SA[51:T] to provide the complete original system address SA[51:0] as indicated at 738 in FIG. 7.

It is appreciated that in generating an error report or other uses of reconstructed binary address fields. one or more of the intermediate binary address fields A1, P, A2, B, A, C, TAX, or TA or one or more the reconstructed system address subfields such as SA[51:T], for example, may be reported in connection with a translated channel address event, in addition to or instead of a complete reconstructed system address SA.

EXAMPLES

The following examples pertain to further embodiments.

Example 1 is an apparatus for use with a memory system having a memory, at least two memory controllers, each memory controller having an associated memory controller target way and three data transfer channels coupling each memory controller to the memory, comprising:

system address reconstruction logic configured to reconstruct at least a portion of a system address of a memory location of the memory, as a function of a channel address translated from the system address and wherein the system address reconstruction logic includes:

calculator logic configured to calculate a first comparison bit as a function of the number of channels per memory controller target way being equal to three, a subfield of the channel address, a binary channel logical identification number, and the number of bits of the granularity of interleaving of data among the memory controller target ways;

comparator logic configured to compare the calculated first comparison bit to a first bit of a binary memory controller target logical identification number; and generator logic configured to generate a first bit of a first intermediate binary address field as a function of said first bit comparing.

In Example 2, the subject matter of Examples 1-8 (excluding the present Example) can optionally include wherein the memory system has at least four memory controller target ways, and wherein:

the calculator logic is further configured to calculate a second comparison bit as a function of the first bit of the first intermediate binary address field, the number of channels per memory controller target way being equal to three, said subfield of the channel address, the binary channel logical identification number, and said number of bits of the granularity of interleaving of data among the memory controller target ways;

the comparator logic is further configured to compare the calculated second comparison bit to a second bit of the binary memory controller target logical identification number; and the generator logic is further configured to generate a second bit of the first intermediate binary address field as a function of said second bit comparing.

In Example 3, the subject matter of Examples 1-8 (excluding the present Example) can optionally include wherein the memory has eight memory controller target ways, and wherein:

the calculator logic is further configured to calculate a third comparison bit as a function of the first and second bits of the first intermediate binary address field, the number of channels per memory controller target way being equal to three, said subfield of the channel address, the binary channel logical identification number, and said number of bits of the granularity of interleaving of data among the memory controller target ways;

the comparator logic is further configured to compare the calculated third comparison bit to a third bit of the binary memory controller target logical identification number; and the generator logic is further configured to generate a third bit of the first intermediate binary address field as a function of said third bit comparing.

In Example 4, the subject matter of Examples 1-8 (excluding the present Example) can optionally include wherein the generator logic is further configured to concatenate the generated bits of the first intermediate binary address field and selected subfields of the channel address to generate a second intermediate binary address field, and to multiply the generated second intermediate binary address field by three, the number of channels per memory controller target way, to generate a third intermediate binary address field.

In Example 5, the subject matter of Examples 1-8 (excluding the present Example) can optionally include wherein generator logic is further configured to add the binary channel logical identification number to the third intermediate binary address field to generate a fourth intermediate binary address field, and to concatenate a subfield of the channel address to the generated fourth intermediate binary address field to generate a fifth intermediate binary address field.

In Example 6, the subject matter of Examples 1-8 (excluding the present Example) can optionally include wherein the number of memory controllers is two or more, the number of channels per memory controller is three, the number of bits of the granularity of interleaving of data among the channels of a memory controller target way is represented by the variable X-0 wherein the variable X is a bit position of the channel address and 0 is the 0 bit position of the channel address, the number of bits of the granularity of interleaving of data among the memory controller target ways is represented by the variables R-X where the variable R is >=X and is a bit position of the channel address, the variable [R-X] represents a bit position, the variable ChLID represents the binary channel logical identification number, the variable A2 represents the subfield of the channel address from the bit position X to the bit position R, the variable TargetLID[0] represents the 0 bit position of the binary memory controller target logical identification number, and the variable P0 represents the first bit of the first intermediate binary address field represented by the variable P, such that the bit P0 is the least significant bit of the intermediate binary address field represented by the variable P, wherein:

the calculator logic is further configured to calculate the first comparison bit as $(3*A2+ChLID)[R-X]$;

the comparator logic is further configured to compare the first comparison bit to the TargetLID[0] bit; and the generator logic is further configured to generate the first bit P0 of the first intermediate binary address field P as a logical zero if the first comparison bit is the same as the TargetLID[0] bit and as a logical one if the first comparison bit is different from the TargetLID[0] bit.

In Example 7, the subject matter of Examples 1-8 (excluding the present Example) can optionally include wherein the number of memory controllers is four or more, the variable TargetLID[1] represents the 1 bit position of the binary memory controller target logical identification number, and the variable P1 represents a second bit P1 of the intermediate binary address field represented by the variable P such that the bit P1 is the second least significant bit of the first intermediate binary address field represented by the variable P, wherein:

the calculator logic is further configured to calculate the second comparison bit as $(3*P0*2**(R-X)+3*A2+ChLID)[R-X]$;

the comparator logic is further configured to compare the second comparison bit to the TargetLID[1] bit; and the generator logic is further configured to generate the second bit P1 of the first intermediate binary address field P as a logical zero if the second comparison bit is the same as the TargetLID[1] bit and as a logical one if the second comparison bit is different from the TargetLID[1] bit.

In Example 8, the subject matter of Examples 1-8 (excluding the present Example) can optionally include wherein the number of memory controllers is eight or more, the variable TargetLID[2] represents the 2 bit position of the binary channel logical identification number, and the variable P2 represents a third bit of the first intermediate binary address field represented by the variable P such that the bit P2 is the third least significant bit of the first intermediate binary address field represented by the variable P, wherein:

the calculator logic is further configured to calculate the third comparison bit as $$(3*P1*2**(R+1-X)+3*P0*2**(R-X)+3*A2+ChLID)[R-X];$$

the comparator logic is further configured to compare the third comparison bit to the TargetLID[2] bit; and the generator logic is further configured to generate the third bit P2 of the first intermediate binary address field P as a logical zero if the third comparison bit is the same as the TargetLID[2] bit and as a logical one if the third comparison bit is different from the TargetLID[2] bit.

Example 9 is a system for use with a display, comprising:
a processor;
a video controller configured to control the display in response to the processor; and
a memory subsystem having a memory, at least two memory controllers, each memory controller having an associated memory controller target way, three data transfer channels coupling each memory controller to the memory, and system address reconstruction logic configured to reconstruct at least a portion of a system address of a memory location of the memory, as a function of a channel address translated from the system address and wherein the system address reconstruction logic includes:
calculator logic configured to calculate a first comparison bit as a function of the number of channels per memory controller target way being equal to three, a subfield of the channel address, a binary channel logical identification number, and the number of bits of the granularity of interleaving of data among the memory controller target ways;
comparator logic configured to compare the calculated first comparison bit to a first bit of a binary memory controller target logical identification number; and
generator logic configured to generate a first bit of a first intermediate binary address field as a function of said first bit comparing.

In Example 10, the subject matter of Examples 9-16 (excluding the present Example) can optionally include wherein the memory subsystem has at least four memory controller target ways, and wherein:
the calculator logic is further configured to calculate a second comparison bit as a function of the first bit of the first intermediate binary address field, the number of channels per memory controller target way being equal to three, said subfield of the channel address, the binary channel logical identification number, and said number of bits of the granularity of interleaving of data among the memory controller target ways;
the comparator logic is further configured to compare the calculated second comparison bit to a second bit of the binary memory controller target logical identification number; and
the generator logic is further configured to generate a second bit of the first intermediate binary address field as a function of said second bit comparing.

In Example 11, the subject matter of Examples 9-16 (excluding the present Example) can optionally include wherein n the memory subsystem has eight memory controller target ways, and wherein:
the calculator logic is further configured to calculate a third comparison bit as a function of the first and second bits of the first intermediate binary address field, the number of channels per memory controller target way being equal to three, said subfield of the channel address, the binary channel logical identification number, and said number of bits of the granularity of interleaving of data among the memory controller target ways;
the comparator logic is further configured to compare the calculated third comparison bit to a third bit of the binary memory controller target logical identification number; and the generator logic is further configured to generate a third bit of the first intermediate binary address field as a function of said third bit comparing.

In Example 12, the subject matter of Examples 9-16 (excluding the present Example) can optionally include wherein the generator logic is further configured to concatenate the generated bits of the first intermediate binary address field and selected subfields of the channel address to generate a second intermediate binary address field, and to multiply the generated second intermediate binary address field by three, the number of channels per memory controller target way, to generate a third intermediate binary address field.

In Example 13, the subject matter of Examples 9-16 (excluding the present Example) can optionally include wherein the generator logic is further configured to add the binary channel logical identification number to the third intermediate binary address field to generate a fourth intermediate binary address field, and to concatenate a subfield of the channel address to the generated fourth intermediate binary address field to generate a fifth intermediate binary address field.

In Example 14, the subject matter of Examples 9-16 (excluding the present Example) can optionally include wherein the number of memory controllers is two or more, the number of channels per memory controller is equal to three, the number of bits of the granularity of interleaving of data among the channels of a memory controller target way is represented by the variable X−0 wherein the variable X is a bit position of the channel address and 0 is the 0 bit position of the channel address, the number of bits of the granularity of interleaving of data among the memory controller target ways is represented by the variables R−X where the variable R is >=X and is a bit position of the channel address, the variable [R−X] represents a bit position, the variable ChLID represents the binary channel logical identification number, the variable A2 represents the subfield of the channel address from the bit position X to the bit position R, the variable TargetLID[0] represents the 0 bit position of the binary memory controller target logical identification number, and the variable P0 represents the first bit of the first intermediate binary address field represented by the variable P, such that the bit P0 is the least significant bit of the intermediate binary address field represented by the variable P, wherein:
the calculator logic is further configured to calculate the first comparison bit as $(3*A2+ChLID)[R-X]$;
the comparator logic is further configured to compare the first comparison bit to the TargetLID[0] bit; and
the generator logic is further configured to generate the first bit P0 of the first intermediate binary address field P as a logical zero if the first comparison bit is the same as the TargetLID[0] bit and as a logical one if the first comparison bit is different from the TargetLID[0] bit.

In Example 15, the subject matter of Examples 9-16 (excluding the present Example) can optionally include wherein the number of memory controllers is four or more, the variable TargetLID[1] represents the 1 bit position of the binary memory controller target logical identification number, and the variable P1 represents a second bit P1 of the intermediate binary address field represented by the variable P such that the bit P1 is the second least significant bit of the first intermediate binary address field represented by the variable P, wherein:
the calculator logic is further configured to calculate the second comparison bit as $(3*P0*2**(R-X)+3*A2+ChLID)[R-X]$;

the comparator logic is further configured to compare the second comparison bit to the TargetLID[1] bit; and the generator logic is further configured to generate the second bit P1 of the first intermediate binary address field P as a logical zero if the second comparison bit is the same as the TargetLID[1] bit and as a logical one if the second comparison bit is different from the TargetLID[1] bit.

In Example 16, the subject matter of Examples 9-16 (excluding the present Example) can optionally include wherein the number of memory controllers is eight or more, the variable TargetLID[2] represents the 2 bit position of the binary channel logical identification number, and the variable P2 represents a third bit of the first intermediate binary address field represented by the variable P such that the bit P2 is the third least significant bit of the first intermediate binary address field represented by the variable P, wherein:

the calculator logic is further configured to calculate the third comparison bit as $$(3*P1*2**(R+1-X)+3*P0*2**(R-X)+3*A2+ChLID)$$
$$[R-X];$$

the comparator logic is further configured to compare the third comparison bit to the TargetLID[2] bit; and the generator logic is further configured to generate the third bit P2 of the first intermediate binary address field P as a logical zero if the third comparison bit is the same as the TargetLID[2] bit and as a logical one if the third comparison bit is different from the TargetLID[2] bit.

Example 17 is a method, comprising:

reconstructing at least a portion of a system address of a memory location of a memory of a memory system, as a function of a channel address translated from the system address wherein the memory system has said memory, at least two memory controllers, each memory controller having an associated memory controller target way and a plurality of data transfer channels coupling each memory controller to the memory and wherein the reconstructing includes:

calculating a first comparison bit as a function of the number of channels per memory controller target way being equal to three, a subfield of the channel address, a binary channel logical identification number, and the number of bits of the granularity of interleaving of data among the memory controller target ways;

comparing the calculated first comparison bit to a first bit of a binary memory controller target logical identification number; and generating a first bit of a first intermediate binary address field as a function of said first bit comparing.

In Example 18, the subject matter of Examples 17-25 (excluding the present Example) can optionally include wherein the memory system has at least four memory controller target ways, and the reconstructing further includes:

calculating a second comparison bit as a function of the first bit of the first intermediate binary address field, the number of channels per memory controller target way being equal to three, said subfield of the channel address, the binary channel logical identification number, and said number of bits of the granularity of interleaving of data among the memory controller target ways;

comparing the calculated second comparison bit to a second bit of the binary memory controller target logical identification number; and generating a second bit of the first intermediate binary address field as a function of said second bit comparing.

In Example 19, the subject matter of Examples 17-25 (excluding the present Example) can optionally include wherein the memory has eight memory controller target ways and the reconstructing further includes:

calculating a third comparison bit as a function of the first and second bits of the first intermediate binary address field, the number of channels per memory controller target way being equal to three, said subfield of the channel address, the binary channel logical identification number, and said number of bits of the granularity of interleaving of data among the memory controller target ways;

comparing the calculated third comparison bit to a third bit of the binary memory controller target logical identification number; and generating a third bit of the first intermediate binary address field as a function of said third bit comparing.

In Example 20, the subject matter of Examples 17-25 (excluding the present Example) can optionally include wherein the reconstructing further includes concatenating the generated bits of the first intermediate binary address field and selected subfields of the channel address to generate a second intermediate binary address field, and multiplying the generated second intermediate binary address field by three, the number of channels per memory controller target way, to generate a third intermediate binary address field.

In Example 21, the subject matter of Examples 17-25 (excluding the present Example) can optionally include wherein the reconstructing further includes to adding the binary channel logical identification number to the third intermediate binary address field to generate a fourth intermediate binary address field, and concatenating a subfield of the channel address to the generated fourth intermediate binary address field to generate a fifth intermediate binary address field.

In Example 22, the subject matter of Examples 17-25 (excluding the present Example) can optionally include wherein the number of memory controllers is two or more, the number of channels per memory controller is equal to three, the number of bits of the granularity of interleaving of data among the channels of a memory controller target way is represented by the variable X-0 wherein the variable X is a bit position of the channel address and 0 is the 0 bit position of the channel address, the number of bits of the granularity of interleaving of data among the memory controller target ways is represented by the variables R-X where the variable R is >=X and is a bit position of the channel address, the variable [R-X] represents a bit position, the variable ChLID represents the binary channel logical identification number, the variable A2 represents the subfield of the channel address from the bit position X to the bit position R, the variable TargetLID[0] represents the 0 bit position of the binary memory controller target logical identification number, and the variable P0 represents the first bit of the first intermediate binary address field represented by the variable P, such that the bit P0 is the least significant bit of the intermediate binary address field represented by the variable P, wherein:

the calculating the first comparison bit includes calculating the first comparison bit as $(3*A2+ChLID)[R-X]$;

the comparing the calculated first comparison bit includes comparing the first comparison bit to the TargetLID[0] bit; and the generating the first bit of the first intermediate binary address field includes generating the first bit P0 of the first intermediate binary address field P as a logical zero if the first comparison bit is the same as the TargetLID[0] bit and as a logical one if the first comparison bit is different from the TargetLID[0] bit.

In Example 23, the subject matter of Examples 17-25 (excluding the present Example) can optionally include wherein the number of memory controllers is four or more, the variable TargetLID[1] represents the 1 bit position of the binary memory controller target logical identification number, and the variable P1 represents a second bit P1 of the intermediate binary address field represented by the variable P such that the bit P1 is the second least significant bit of the first intermediate binary address field represented by the variable P, wherein:

the calculating the second comparison bit includes calculating the second comparison bit as (3*P0*2**(R−X)+ 3*A2+ChLID)[R−X];

the comparing the calculated second comparison bit includes comparing the second comparison bit to the TargetLID[1] bit; and the generating the second bit of the first intermediate binary address field includes generating the second bit P1 of the first intermediate binary address field P as a logical zero if the second comparison bit is the same as the TargetLID[1] bit and as a logical one if the second comparison bit is different from the TargetLID[1] bit.

In Example 24, the subject matter of Examples 17-25 (excluding the present Example) can optionally include wherein the number of memory controllers is eight or more, the variable TargetLID[2] represents the 2 bit position of the binary channel logical identification number, and the variable P2 represents a third bit of the first intermediate binary address field represented by the variable P such that the bit P2 is the third least significant bit of the first intermediate binary address field represented by the variable P, wherein:

the calculating the third comparison bit includes calculating the third comparison bit as (3*P1*2**(R+1−X)+3*P0*2**(R−X)+3*A2+ChLID)
[R−X];

the comparing the calculated third comparison bit includes comparing the third comparison bit to the TargetLID[2] bit; and the generating the third bit of the first intermediate binary address field includes generating the third bit P2 of the first intermediate binary address field P as a logical zero if the third comparison bit is the same as the TargetLID[2] bit and as a logical one if the third comparison bit is different from the TargetLID[2] bit.

In Example 25, the subject matter of Examples 17-25 (excluding the present Example) can optionally include at least one operation of:

(1) wherein the memory system has at least four memory controller target ways, and the reconstructing further includes:

calculating a second comparison bit as a function of the first bit of the first intermediate binary address field, the number of channels per memory controller target way being equal to three, said subfield of the channel address, the binary channel logical identification number, and said number of bits of the granularity of interleaving of data among the memory controller target ways;

comparing the calculated second comparison bit to a second bit of the binary memory controller target logical identification number; and generating a second bit of the first intermediate binary address field as a function of said second bit comparing;

(2) wherein the memory has eight memory controller target ways and the reconstructing further includes:

calculating a third comparison bit as a function of the first and second bits of the first intermediate binary address field, the number of channels per memory controller target way being equal to three, said subfield of the channel address, the binary channel logical identification number, and said number of bits of the granularity of interleaving of data among the memory controller target ways;

comparing the calculated third comparison bit to a third bit of the binary memory controller target logical identification number; and generating a third bit of the first intermediate binary address field as a function of said third bit comparing;

(3) wherein the reconstructing further includes concatenating the generated bits of the first intermediate binary address field and selected subfields of the channel address to generate a second intermediate binary address field, and multiplying the generated second intermediate binary address field by three, the number of channels per memory controller target way, to generate a third intermediate binary address field;

(4) wherein the reconstructing further includes to adding the binary channel logical identification number to the third intermediate binary address field to generate a fourth intermediate binary address field, and concatenating a subfield of the channel address to the generated fourth intermediate binary address field to generate a fifth intermediate binary address field;

(5) wherein the number of memory controllers is two or more, the number of channels per memory controller is equal to three, the number of bits of the granularity of interleaving of data among the channels of a memory controller target way is represented by the variable X−0 wherein the variable X is a bit position of the channel address and 0 is the 0 bit position of the channel address, the number of bits of the granularity of interleaving of data among the memory controller target ways is represented by the variables R−X where the variable R is >=X and is a bit position of the channel address, the variable [R−X] represents a bit position, the variable ChLID represents the binary channel logical identification number, the variable A2 represents the subfield of the channel address from the bit position X to the bit position R, the variable TargetLID[0] represents the 0 bit position of the binary memory controller target logical identification number, and the variable P0 represents the first bit of the first intermediate binary address field represented by the variable P, such that the bit P0 is the least significant bit of the intermediate binary address field represented by the variable P, wherein:

the calculating the first comparison bit includes calculating the first comparison bit as (3*A2+ChLID)[R−X];

the comparing the calculated first comparison bit includes comparing the first comparison bit to the TargetLID[0] bit; and the generating the first bit of the first intermediate binary address field includes generating the first bit P0 of the first intermediate binary address field P as a logical zero if the first comparison bit is the same as the TargetLID[0] bit and as a logical one if the first comparison bit is different from the TargetLID[0] bit;

(6) wherein the number of memory controllers is four or more, the variable TargetLID[1] represents the 1 bit position of the binary memory controller target logical identification number, and the variable P1 represents a second bit P1 of the intermediate binary address field represented by the variable P such that the bit P1 is the second least significant bit of the first intermediate binary address field represented by the variable P, wherein:

the calculating the second comparison bit includes calculating the second comparison bit as $(3*P0*2**(R-X)+3*A2+ChLID)[R-X]$;

the comparing the calculated second comparison bit includes comparing the second comparison bit to the TargetLID[1] bit; and the generating the second bit of the first intermediate binary address field includes generating the second bit P1 of the first intermediate binary address field P as a logical zero if the second comparison bit is the same as the TargetLID[1] bit and as a logical one if the second comparison bit is different from the TargetLID[1] bit; and (7) wherein the number of memory controllers is eight or more, the variable TargetLID[2] represents the 2 bit position of the binary channel logical identification number, and the variable P2 represents a third bit of the first intermediate binary address field represented by the variable P such that the bit P2 is the third least significant bit of the first intermediate binary address field represented by the variable P, wherein:

the calculating the third comparison bit includes calculating the third comparison bit as $(3*P1*2**(R+1-X)+3*P0*2**(R-X)+3*A2+ChLID)[R-X]$;

the comparing the calculated third comparison bit includes comparing the third comparison bit to the TargetLID[2] bit; and the generating the third bit of the first intermediate binary address field includes generating the third bit P2 of the first intermediate binary address field P as a logical zero if the third comparison bit is the same as the TargetLID[2] bit and as a logical one if the third comparison bit is different from the TargetLID[2] bit.

Example 26 is an apparatus for use with a memory system having a memory, at least two memory controllers, each memory controller having an associated memory controller target way and three data transfer channels coupling each memory controller to the memory, comprising:

means for reconstructing at least a portion of a system address of a memory location of the memory, as a function of a channel address translated from the system address and wherein the reconstructing includes:

means for calculating a first comparison bit as a function of the number of channels per memory controller target way being equal to three, a subfield of the channel address, a binary channel logical identification number, and the number of bits of the granularity of interleaving of data among the memory controller target ways;

means for comparing the calculated first comparison bit to a first bit of a binary memory controller target logical identification number; and means for generating a first bit of a first intermediate binary address field as a function of said first bit comparing.

In Example, 27, the subject matter of Example 26 can optionally include wherein the memory system has at least four memory controller target ways, and the reconstructing means further includes:

means for calculating a second comparison bit as a function of the first bit of the first intermediate binary address field, the number of channels per memory controller target way being equal to three, said subfield of the channel address, the binary channel logical identification number, and said number of bits of the granularity of interleaving of data among the memory controller target ways;

means for comparing the calculated second comparison bit to a second bit of the binary memory controller target logical identification number; and means for generating a second bit of the first intermediate binary address field as a function of said second bit comparing.

Example 28 is an apparatus comprising means to perform a method as described in any preceding Example.

Example 29 is a machine-readable storage including machine-readable instructions, when executed, to implement a method or realize an apparatus or system as claimed in any preceding claim.

The described operations may be implemented as a method, apparatus or computer program product using standard programming and/or engineering techniques to produce software, firmware, hardware, or any combination thereof. The described operations may be implemented as computer program code maintained in a "computer readable storage medium", where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmissions signals. Those skilled in the art will recognize that many modifications may be made to this configuration without departing from the scope of the present description, and that the article of manufacture may comprise suitable information bearing medium known in the art. Of course, those skilled in the art will recognize that many modifications may be made to this configuration without departing from the scope of the present description, and that the article of manufacture may comprise any tangible information bearing medium known in the art.

In certain applications, a device in accordance with the present description, may be embodied in a computer system including a video controller to render information to display on a monitor or other display coupled to the computer system, a device driver and a network controller, such as a computer system comprising a desktop, workstation, server, mainframe, laptop, handheld computer, etc. Alternatively, the device embodiments may be embodied in a computing device that does not include, for example, a video controller, such as a switch, router, etc., or does not include a network controller, for example.

The illustrated logic of figures may show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit to the precise form disclosed. Many modifications and variations are possible in light of the above teaching.

What is claimed is:

1. An apparatus for use with a memory system having a memory, at least two memory controllers, each memory controller having an associated memory controller target way and three data transfer channels coupling each memory controller to the memory, comprising:
   data transfer logic configured to perform an input/output (I/O) operation at a memory location of the memory of the memory system, as a function of a channel address of the memory location translated from a system address of the memory location wherein the data transfer logic includes system address reconstruction logic configured to reconstruct at least a portion of the system address of the memory location of the memory, as a function of the channel address translated from the system address and wherein the system address reconstruction logic includes:
      calculator logic configured to calculate a first comparison bit as a function of a number of channels per memory controller target way being equal to three, a subfield of the channel address, a binary channel logical identification number, and a number of bits of a granularity of interleaving of data among the memory controller target ways;
      comparator logic configured to compare the calculated first comparison bit to a first bit of a binary memory controller target logical identification number; and
      generator logic configured to generate a first bit of a first intermediate binary address field as a function of said first bit comparing, and to concatenate at least one generated bit of the first intermediate binary address field and at least one selected subfield of the channel address to generate a second intermediate binary address field.

2. The apparatus of claim 1 wherein the memory system has at least four memory controller target ways, and wherein:
   the calculator logic is further configured to calculate a second comparison bit as a function of the first bit of the first intermediate binary address field, the number of channels per memory controller target way being equal to three, said subfield of the channel address, the binary channel logical identification number, and said number of bits of the granularity of interleaving of data among the memory controller target ways;
   the comparator logic is further configured to compare the calculated second comparison bit to a second bit of the binary memory controller target logical identification number; and
   the generator logic is further configured to generate a second bit of the first intermediate binary address field as a function of said second bit comparing.

3. The apparatus of claim 2 wherein the memory has eight memory controller target ways, and wherein:
   the calculator logic is further configured to calculate a third comparison bit as a function of the first and second bits of the first intermediate binary address field, the number of channels per memory controller target way being equal to three, said subfield of the channel address, the binary channel logical identification number, and said number of bits of the granularity of interleaving of data among the memory controller target ways;
   the comparator logic is further configured to compare the calculated third comparison bit to a third bit of the binary memory controller target logical identification number; and
   the generator logic is further configured to generate a third bit of the first intermediate binary address field as a function of said third bit comparing.

4. The apparatus of claim 3 wherein the generator logic is further configured to concatenate the generated bits of the first intermediate binary address field and selected subfields of the channel address to generate the second intermediate binary address field, and to multiply the generated second intermediate binary address field by three, the number of channels per memory controller target way, to generate a third intermediate binary address field.

5. The apparatus of claim 4 wherein generator logic is further configured to add the binary channel logical identification number to the third intermediate binary address field to generate a fourth intermediate binary address field, and to concatenate a subfield of the channel address to the generated fourth intermediate binary address field to generate a fifth intermediate binary address field.

6. The apparatus of claim 3 wherein the number of memory controllers is two or more, the number of channels per memory controller is three, the number of bits of the granularity of interleaving of data among the channels of a memory controller target way is represented by variable X–0 wherein X is a bit position of the channel address and 0 is a 0 bit position of the channel address, the number of bits of the granularity of interleaving of data among the memory controller target ways is represented by variable R–X where R is $>=X$ and is a bit position of the channel address, the variable R–X represents a bit position, variable ChLID represents the binary channel logical identification number, variable A2 represents the subfield of the channel address from the bit position X to the bit position R, variable TargetLID[0] represents the 0 bit position of the binary memory controller target logical identification number, and variable P0 represents the first bit of the first intermediate binary address field represented by P, such that the bit P0 is the least significant bit of the intermediate binary address field represented by P, wherein:
   the calculator logic is further configured to calculate the first comparison bit as $(3*A2+ChLID)[R-X]$;
   the comparator logic is further configured to compare the first comparison bit to the TargetLID[0] bit; and
   the generator logic is further configured to generate the first bit P0 of the first intermediate binary address field P as a logical zero if the first comparison bit is the same as the TargetLID[0] bit and as a logical one if the first comparison bit is different from the TargetLID[0] bit.

7. The apparatus of claim 6 wherein the number of memory controllers is four or more, a variable TargetLID[1]

represents the 1 bit position of the binary memory controller target logical identification number, and a variable P1 represents a second bit P1 of the intermediate binary address field represented by the variable P such that the bit P1 is the second least significant bit of the first intermediate binary address field represented by the variable P, wherein:
   the calculator logic is further configured to calculate the second comparison bit as (3*P0*2**(R−X)+3*A2+ChLID)[R−X];
   the comparator logic is further configured to compare the second comparison bit to the TargetLID[1] bit; and
   the generator logic is further configured to generate the second bit P1 of the first intermediate binary address field P as a logical zero if the second comparison bit is the same as the TargetLID[1] bit and as a logical one if the second comparison bit is different from the TargetLID[1] bit.

8. The apparatus of claim 7 wherein the number of memory controllers is eight or more, the variable TargetLID[2] represents a 2 bit position of the binary channel logical identification number, and a variable P2 represents a third bit of the first intermediate binary address field represented by the variable P such that the bit P2 is the third least significant bit of the first intermediate binary address field represented by the variable P, wherein:
   the calculator logic is further configured to calculate the third comparison bit as (3*P1*2**(R+1−X)+3*P0*2**(R−X)+3*A2+ChLID)
      [R−X];

the comparator logic is further configured to compare the third comparison bit to the TargetLID[2] bit; and
   the generator logic is further configured to generate the third bit P2 of the first intermediate binary address field P as a logical zero if the third comparison bit is the same as the TargetLID[2] bit and as a logical one if the third comparison bit is different from the TargetLID[2] bit.

9. A system for use with a display, comprising:
a processor;
a video controller configured to control the display in response to the processor; and
a memory subsystem having a memory, at least two memory controllers, each memory controller having an associated memory controller target way, three data transfer channels coupling each memory controller to the memory, and data transfer logic of a memory controller configured to perform an input/output (I/O) operation at a memory location of the memory of the memory subsystem, as a function of a channel address of the memory location translated from a system address of the memory location wherein the data transfer logic includes system address reconstruction logic configured to reconstruct at least a portion of the system address of the memory location of the memory, as a function of the channel address translated from the system address and wherein the system address reconstruction logic includes:
   calculator logic configured to calculate a first comparison bit as a function of a number of channels per memory controller target way being equal to three, a subfield of the channel address, a binary channel logical identification number, and a number of bits of a granularity of interleaving of data among the memory controller target ways;
   comparator logic configured to compare the calculated first comparison bit to a first bit of a binary memory controller target logical identification number; and
   generator logic configured to generate a first bit of a first intermediate binary address field as a function of said first bit comparing, and to concatenate at least one generated bit of the first intermediate binary address field and at least one selected subfield of the channel address to generate a second intermediate binary address field.

10. The system of claim 9 wherein the memory subsystem has at least four memory controller target ways, and wherein:
   the calculator logic is further configured to calculate a second comparison bit as a function of the first bit of the first intermediate binary address field, the number of channels per memory controller target way being equal to three, said subfield of the channel address, the binary channel logical identification number, and said number of bits of the granularity of interleaving of data among the memory controller target ways;
   the comparator logic is further configured to compare the calculated second comparison bit to a second bit of the binary memory controller target logical identification number; and
   the generator logic is further configured to generate a second bit of the first intermediate binary address field as a function of said second bit comparing.

11. The system of claim 10 wherein the memory subsystem has eight memory controller target ways, and wherein:
   the calculator logic is further configured to calculate a third comparison bit as a function of the first and second bits of the first intermediate binary address field, the number of channels per memory controller target way being equal to three, said subfield of the channel address, the binary channel logical identification number, and said number of bits of the granularity of interleaving of data among the memory controller target ways;
   the comparator logic is further configured to compare the calculated third comparison bit to a third bit of the binary memory controller target logical identification number; and
   the generator logic is further configured to generate a third bit of the first intermediate binary address field as a function of said third bit comparing.

12. The system of claim 11 wherein the generator logic is further configured to concatenate the generated bits of the first intermediate binary address field and selected subfields of the channel address to generate the second intermediate binary address field, and to multiply the generated second intermediate binary address field by three, the number of channels per memory controller target way, to generate a third intermediate binary address field.

13. The system of claim 12 wherein generator logic is further configured to add the binary channel logical identification number to the third intermediate binary address field to generate a fourth intermediate binary address field, and to concatenate a subfield of the channel address to the generated fourth intermediate binary address field to generate a fifth intermediate binary address field.

14. The system of claim 11 wherein the number of memory controllers is two or more, the number of channels per memory controller is equal to three, the number of bits of the granularity of interleaving of data among the channels of a memory controller target way is represented by variable X−0 wherein X is a bit position of the channel address and 0 is a 0 bit position of the channel address, the number of bits of the granularity of interleaving of data among the memory controller target ways is represented by variable R−X where R is >=X and is a bit position of the channel address, the variable R−X represents a bit position, variable ChLID represents the binary channel logical identification number, variable A2 represents the subfield of the channel address from the bit position X to the bit position R, variable TargetLID[0] represents the 0 bit position of the binary memory controller target logical identification number, and variable P0 represents the first bit of the first intermediate binary address field represented by P, such that the bit P0 is the least significant bit of the intermediate binary address field represented by P, wherein:

the calculator logic is further configured to calculate the first comparison bit as (3*A2+ChLID)[R−X];

the comparator logic is further configured to compare the first comparison bit to the TargetLID[0] bit; and the generator logic is further configured to generate the first bit P0 of the first intermediate binary address field P as a logical zero if the first comparison bit is the same as the TargetLID[0] bit and as a logical one if the first comparison bit is different from the TargetLID[0] bit.

15. The system of claim 14 wherein the number of memory controllers is four or more, a variable TargetLID[1] represents the 1 bit position of the binary memory controller target logical identification number, and a variable P1 represents a second bit P1 of the intermediate binary address field represented by the variable P such that the bit P1 is the second least significant bit of the first intermediate binary address field represented by the variable P, wherein:

the calculator logic is further configured to calculate the second comparison bit as (3*P0*2**(R−X)+3*A2+ChLID)[R−X];

the comparator logic is further configured to compare the second comparison bit to the TargetLID[1] bit; and the generator logic is further configured to generate the second bit P1 of the first intermediate binary address field P as a logical zero if the second comparison bit is the same as the TargetLID[1] bit and as a logical one if the second comparison bit is different from the TargetLID[1] bit.

16. The system of claim 15 wherein the number of memory controllers is eight or more, the variable TargetLID[2] represents a 2 bit position of the binary channel logical identification number, and a variable P2 represents a third bit of the first intermediate binary address field represented by the variable P such that the bit P2 is the third least significant bit of the first intermediate binary address field represented by the variable P, wherein:

the calculator logic is further configured to calculate the third comparison bit as (3*P1*2**(R+1−X)+3*P0*2**(R−X)+3*A2+ChLID)
[R−X];

the comparator logic is further configured to compare the third comparison bit to the TargetLID[2] bit; and the generator logic is further configured to generate the third bit P2 of the first intermediate binary address field P as a logical zero if the third comparison bit is the same as the TargetLID[2] bit and as a logical one if the third comparison bit is different from the TargetLID[2] bit.

17. A method, comprising:

performing an input/output (I/O) operation at a memory location of a memory of a memory system, as a function of a channel address of the memory location translated from a system address of the memory location wherein the memory system has said memory, at least two memory controllers, each memory controller having an associated memory controller target way and a plurality of data transfer channels coupling each memory controller to the memory, wherein the performing of an P0 operation includes reconstructing at least a portion of the system address of the memory location as a function of the channel address translated from the system address and wherein the reconstructing includes:

calculating a first comparison bit as a function of a number of channels per memory controller target way being equal to three, a subfield of the channel address, a binary channel logical identification number, and a number of bits of a granularity of interleaving of data among the memory controller target ways;

comparing the calculated first comparison bit to a first bit of a binary memory controller target logical identification number; and generating a first bit of a first intermediate binary address field as a function of said first bit comparing, and concatenating at least one generated bit of the first intermediate binary address field and at least one selected subfield of the channel address to generate a second intermediate binary address field.

18. The method of claim 17 wherein the memory system has at least four memory controller target ways, and the reconstructing further includes:

calculating a second comparison bit as a function of the first bit of the first intermediate binary address field, the number of channels per memory controller target way being equal to three, said subfield of the channel address, the binary channel logical identification number, and said number of bits of the granularity of interleaving of data among the memory controller target ways;

comparing the calculated second comparison bit to a second bit of the binary memory controller target logical identification number; and generating a second bit of the first intermediate binary address field as a function of said second bit comparing.

19. The method of claim 18 wherein the memory has eight memory controller target ways and the reconstructing further includes:

calculating a third comparison bit as a function of the first and second bits of the first intermediate binary address field, the number of channels per memory controller target way being equal to three, said subfield of the channel address, the binary channel logical identification number, and said number of bits of the granularity of interleaving of data among the memory controller target ways;

comparing the calculated third comparison bit to a third bit of the binary memory controller target logical identification number; and generating a third bit of the first intermediate binary address field as a function of said third bit comparing.

20. The method of claim 19 wherein the reconstructing further includes concatenating the generated bits of the first intermediate binary address field and selected subfields of the channel address to generate the second intermediate binary address field, and multiplying the generated second intermediate binary address field by three, the number of channels per memory controller target way, to generate a third intermediate binary address field.

21. The method of claim 20 wherein the reconstructing further includes adding the binary channel logical identification number to the third intermediate binary address field to generate a fourth intermediate binary address field, and concatenating a subfield of the channel address to the generated fourth intermediate binary address field to generate a fifth intermediate binary address field.

22. The method of claim 19 wherein the number of memory controllers is two or more, the number of channels per memory controller is equal to three, the number of bits of the granularity of interleaving of data among the channels of a memory controller target way is represented by variable X−0 wherein X is a bit position of the channel address and 0 is a 0 bit position of the channel address, the number of bits of the granularity of interleaving of data among the memory controller target ways is represented by variable R−X where R is >=X and is a bit position of the channel address, the variable R−X represents a bit position, variable ChLID represents the binary channel logical identification number, variable A2 represents the subfield of the channel address from the bit position X to the bit position R, variable TargetLID[0] represents the 0 bit position of the binary memory controller target logical identification number, and variable P0 represents the first bit of the first intermediate binary address field represented by P, such that the bit P0 is the least significant bit of the intermediate binary address field represented by P, wherein:
the calculating the first comparison bit includes calculating the first comparison bit as $(3*A2+ChLID)[R-X]$;
the comparing the calculated first comparison bit includes comparing the first comparison bit to the TargetLID[0] bit; and
the generating the first bit of the first intermediate binary address field includes generating the first bit P0 of the first intermediate binary address field P as a logical zero if the first comparison bit is the same as the TargetLID [0] bit and as a logical one if the first comparison bit is different from the TargetLID[0] bit.

23. The method of claim 22 wherein the number of memory controllers is four or more, a variable TargetLID[1] represents the 1 bit position of the binary memory controller target logical identification number, and a variable P1 represents a second bit P1 of the intermediate binary address field represented by the variable P such that the bit P1 is the second least significant bit of the first intermediate binary address field represented by the variable P, wherein:
the calculating the second comparison bit includes calculating the second comparison bit as $(3*P0*2**(R-X)+3*A2+ChLID)[R-X]$;

the comparing the calculated second comparison bit includes comparing the second comparison bit to the TargetLID[1] bit; and
the generating the second bit of the first intermediate binary address field includes generating the second bit P1 of the first intermediate binary address field P as a logical zero if the second comparison bit is the same as the TargetLID[1] bit and as a logical one if the second comparison bit is different from the TargetLID[1] bit.

24. The method of claim 23 wherein the number of memory controllers is eight or more, the variable TargetLID [2] represents a 2 bit position of the binary channel logical identification number, and a variable P2 represents a third bit of the first intermediate binary address field represented by the variable P such that the bit P2 is the third least significant bit of the first intermediate binary address field represented by the variable P, wherein:
the calculating the third comparison bit includes calculating the third comparison bit as $(3*P1*2**(R+1-X)+3*P0*2**(R-X)+3*A2+ChLID)[R-X]$;

the comparing the calculated third comparison bit includes comparing the third comparison bit to the TargetLID[2] bit; and
the generating the third bit of the first intermediate binary address field includes generating the third bit P2 of the first intermediate binary address field P as a logical zero if the third comparison bit is the same as the TargetLID [2] bit and as a logical one if the third comparison bit is different from the TargetLID[2] bit.

* * * * *